Oct. 22, 1935.    J. A. PLUGGE    2,017,869
LIGHT COMPENSATOR
Filed Oct. 19, 1933
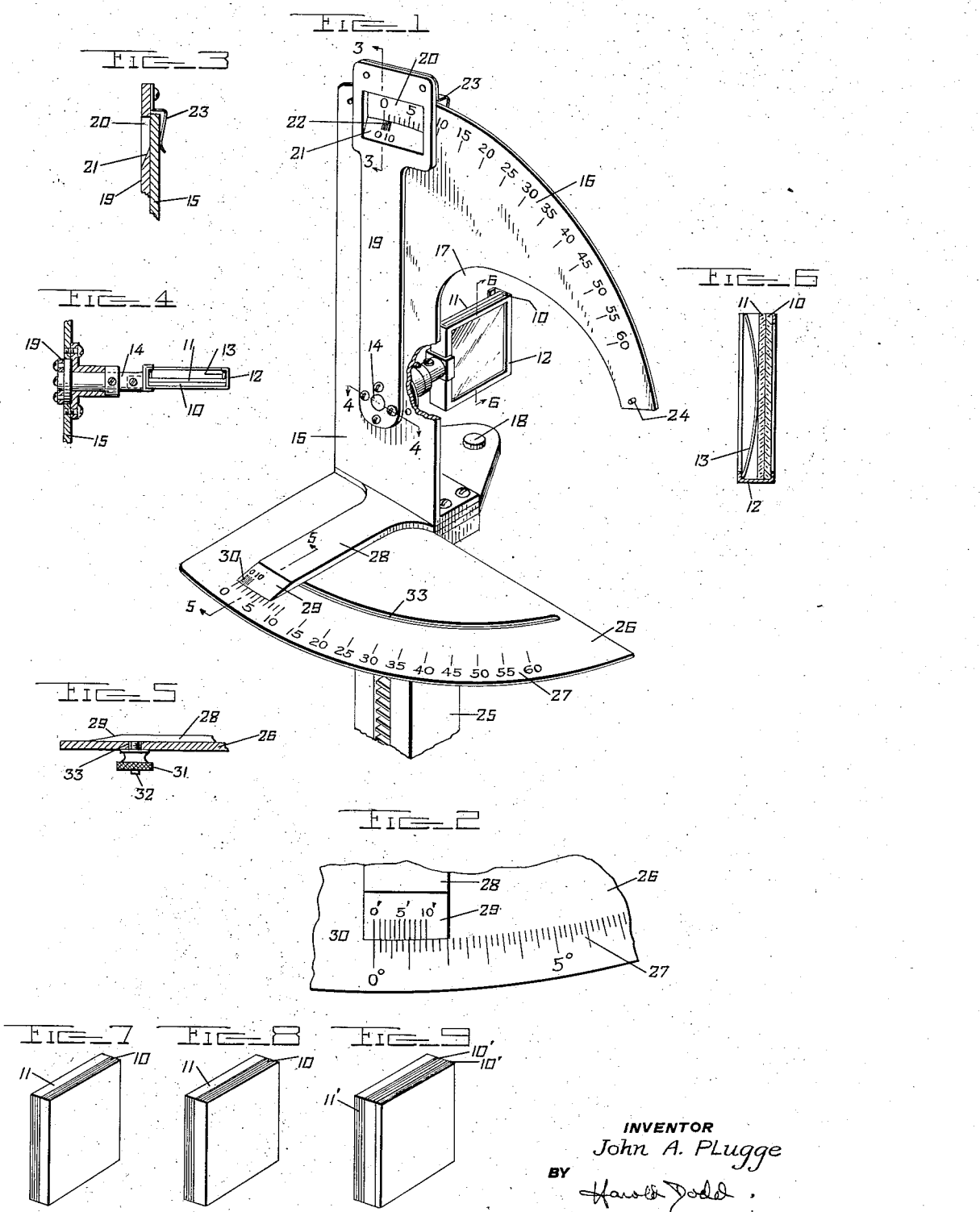
INVENTOR
John A. Plugge
BY
Harold Dodd
ATTORNEY Patented Oct. 22, 1935

2,017,869

UNITED STATES PATENT OFFICE 2,017,869

LIGHT COMPENSATOR

John A. Plugge, Washington, D. C.

Application October 19, 1933, Serial No. 694,272

11 Claims. (Cl. 88—14)

(Granted under the act of March 3, 1883, as amended April 30, 1928; 370 O. G. 757)

This invention relates to a device for compensating rays of light whereof one has been retarded with respect to the other by double refraction and has for its object to provide apparatus for the purpose mentioned that will eliminate the necessity for using wedges and will have a uniform and relatively large field.

In the drawing:

Fig. 1 is a side elevational view of my invention;

Fig. 2 is an enlarged detail of a portion of the fixed scale thereof;

Figs. 3, 4, 5 and 6 are detail sectional views taken on the lines 3—3, 4—4, 5—5 and 6—6, respectively, of Fig. 1;

Figs. 7, 8 and 9 are perspective views of various plate assemblies employed in my new apparatus.

My invention will be described in its application to photo-elastic investigations but its usefulness is by no means limited thereto. In work of the type mentioned stresses are applied to a transparent, normally isotropic substance and they produce in that substance an artificial aeolotropic condition that is readily detectable by polarized light and thus the nature and distribution of the stresses in the material can be studied. When light impinges upon a specimen of the nature mentioned that is under stress it is polarized in two directions, namely, along the directions of the two principal stresses at each point.

Since the birefringence is proportional to the algebraic sum of the two principal stresses at each point, it affords a measure of this stress difference. This is true for the two rays each travel at rates proportional to the stress in their respective paths, one ray being retarded with respect to the other proportionally to the difference of the two principal stresses. At a free edge one principal stress is known to be zero, hence the stress difference equals the other principal stress. Then integrating along a previously determined line of principal stress the individual principal stresses at each point can be computed from these data. The equation used is the well known Filon's equation. If, now, the two rays are passed through a compensator, the magnitude of the compensation required provides the data necessary for determining the stress present at any point or area in the test specimen.

I am aware that variable compensators using wedges are well known but they are expensive due to the great skill and care necessary to produce wedges of the right thickness having accurately plane faces forming exactly the desired angle of the wedge. In my device I utilize two plates of birefringent material each of which has two plane faces parallel to each other and to the optic axis of the material, placed in face-to-face contact with the optic axes crossed at right angles to each other. It is relatively easy to prepare the crystal plates as above described and a further favorable item is that they may be made from material that is rejected in the making of piezo-electric crystal plates.

In Fig. 1 the two doubly refracting plates 10 and 11 are shown mounted in a frame 12 that is open on its upper edge but is of channel form on the other three edges, as is clearly shown in Figs. 1, 4, and 6, to receive the plates. These plates give a uniform field of much greater extent than is possible with wedges. A spring 13 is disposed in the channel at each end of frame 12 to hold the plates firmly in position and yet permit of their ready removal for cleaning or to substitute plates of different thickness, etc. A shaft 14 is secured to frame 12 with its longitudinal axis as nearly as possible coincident with the center point of one end of the plate assembly and is rotatably supported in a vertically extending member 15 that carries adjacent its outer edge a scale 16 of degrees of arc concentric with the shaft 14, the member 15 being cut away as indicated at 17 to permit the rotation of member 15 about a vertical axis 18 without cutting off the light from the plates in frame 12. Fixed to shaft 14 to rotate therewith, preferably with its longitudinal center line substantially in the median plane through the plates and parallel to the faces thereof, is an arm 19 that has in its radially outer end an aperture 20 through which scale 16 is visible, one wall 21 of said aperture being beveled and having on it a Vernier scale 22 to aid in reading scale 16. Secured to the back of arm 19 at its outer end is a spring friction member 23 that bears against the back of member 15 and holds arm 19 in any position to which it is set. A stop 24 is provided to prevent displacement of arm 19 completely off the member 15.

To the pedestal 25 that supports pivot 18 is secured a horizontal member 26 having on it a scale 27 of degrees of arc concentric with the pivot 18. An arm 28 is fixed to member 15 to rotate therewith about the pivot 18 and has at its outer end a beveled face 29 whereon is a Vernier scale 30 to cooperate with scale 27. The arm 28 is fixed in position on scale 27 by a nut 31 on a threaded stud 32 carried by arm 28 and extending through a slot 33 in member 26.

Preferably, the zero point of vernier 30 lies in the plane defined by the axis of pivot 18 and axis of shaft 14. These axes intersect at the center point of the birefringent plates and therefore that point remains fixed in the same position regardless of rotation on shaft 14 or on pivot 18.

Plates 10 and 11 are preferably made of quartz cut parallel to the optic axis and placed in face-to-face contact either with or without a transparent cementing medium between, and with the optic axes at right angles to each other as indicated by the lining on the edges of the plates in Figs. 7, 8 and 9. A thickness for each plate that has been found to be very satisfactory is 1.27 mm., although this dimension is given for purpose of illustration only and not by way of limitation. In Fig. 9 there are shown a plate 11' in combination with two plates 10' that make up the required thickness instead of using a single plate; this is given to show the flexibility of construction involved in my device.

When the plates in frame 12 are vertical and light strikes normally upon them it is split in plate 10 into an ordinary ray and an extraordinary ray traveling at different velocities therethrough, the former having its direction of vibration perpendicular to the optic axis and the latter vibrating at right angles to the vibration of the ordinary ray. However, when the two rays pass from plate 10 into plate 11, the ordinary ray, which was vibrating at right angles to the optic axis in plate 10 is vibrating parallel to the optic axis in plate 11 and therefore becomes the extraordinary ray, and likewise the extraordinary ray in plate 10 becomes the ordinary ray in plate 11 and hence the two rays emerge from plate 11 in the same relationship as prevailed before passing into plate 10. The index of refraction of the ordinary ray is constant in all directions through the crystal but the extraordinary index is variable, depending upon the angle of incidence between the ray and the optic axis, being substantially equal to the ordinary index as the optic axis is closely approached and having its minimum value when the extraordinary ray is at right angles to the optic axis.

The foregoing discussion makes apparent the optical principle of my invention. If frame 12 be rotated by means of shaft 14 it is obvious that the ordinary ray in plate 10, which becomes the extraordinary ray in plate 11, will have its angle of incidence with respect to the optic axis in plate 11 changed and therefore the index of refraction with respect thereto will be varied whereas the extraordinary ray in plate 10, vibrating parallel to the optic axis in plate 10, will become the ordinary ray in plate 11 but since the index of refraction of the ordinary ray is the same regardless of angle of incidence between the ray and the optic axis, there will be no change in the index with respect thereto in plate 11 and therefore there will be a differential retardation of one of the rays with respect to the other, thereby making it possible to compensate in plates 10 and 11 for a relative retardation existing between the rays when they impinge upon plate 10. All that is necessary, then, is to rotate shaft 14 and frame 12 until the compensation of the light through a stressed specimen is effected and the angle of tilt of the plates can then be read from the proper scale and by a suitable calculation the stress at the point or area observed can be determined. Likewise, if found desirable or necessary, the plates may be retained in a vertical position but rotated about pivot 18 to procure the necessary differential retardation to compensate the light rays. It is apparent that the scales 16 and 27 might each be duplicated in the opposite direction from its zero point and thus give two opposite angles of tilt of the plates about each axis at which compensation would occur and so provide a check upon the accuracy of the readings.

It is well known that when a member, such as a beam, is loaded there is a mathematical surface therein on one side of which the material is in compression and on the other side of which it is under tension, this surface being known as the neutral axis. When the birefringent body in my device is rotated about one axis it causes the dark line of zero interference, which defines the position of the neutral axis, to move to one edge of the stressed member, and if rotated about the axis at right angles thereto it causes movement of this line to the opposite edge of the member. It is thus apparent that a device for the purpose of my invention must have the birefringent material capable of rotation about two axes at right angles to each other to make possible the complete examination of the stresses in the material being examined.

The invention herein described may be manufactured and used by or for the Government of the United States of America for governmental purposes, without the payment of any royalties thereon.

I claim:

1. A device of the class described, comprising two plates of doubly refracting material of equal thickness having plane faces parallel to each other and to the respective optic axes, disposed in face-to-face contact with their said axes at right angles to each other, a frame for supporting said plates, resilient means to retain said plates in position in the frame, a horizontally disposed shaft secured to said frame with its axis at the median point of one side of said frame, a vertical member in which said shaft is journalled, said member having on it a scale of units of arc concentric with said shaft, an arm mounted on said shaft to rotate therewith having on it a Vernier calibration movable over said scale, a vertical pivot for said vertical member having its axis lying substantially on the center line of the frame at right angles to said shaft, a horizontal member having on it a scale of units of arc concentric with said pivot, and an arm connected to said vertical member, said arm being rotatable about said pivot and having on its radially outer end a Vernier calibration to cooperate with the scale on said horizontal member.

2. A device of the class described, comprising two plates of doubly refracting material of equal thickness having plane faces parallel to each other and to the respective optic axes, disposed in face-to-face contact with their said axes at right angles to each other, means to hold said plates, a rotatable mounting for said means having its axis on the horizontal center line of said plates, a vertical pivot operatively associated with said means and disposed with its axis on the normal vertical center line of said plates, a vertical member having on it a scale of units of arc concentric with said rotatable mounting, an arm fixed on said mounting to rotate therewith and having its outer end movable over said scale, a horizontal member having on it a scale of units of arc concentric with said pivot, and an arm connected to said vertical member, said arm being rotatable on said pivot and having an outer end movable over the scale on said horizontal member.

3. A device of the class described, comprising two plates of doubly refracting material of equal thickness having plane faces parallel to each other and to the respective optic axes, disposed in face-to-face contact with their said axes at right angles to each other, means supporting said plates for rotation about mutually perpendicular axes, a member bearing a scale of units of arc parallel to each of said axes, each of said scales being concentric with the axis of rotation perpendicular to the plane of such scale, an arm connected to one of said members and rotatable therewith about the axis parallel to said member, the outer end of said arm being movable over the scale on the other of said members, and a second arm connected to rotate with said plates about the other of said axes and having its outer end movable over the scale on the member perpendicular to the axis of rotation of said second arm.

4. A device of the class described, comprising two plates of doubly refracting material of equal thickness having plane faces parallel to each other and to the respective optic axes, disposed in face-to-face contact with their said axes at right angles to each other, means supporting said plates for rotation about mutually perpendicular axes, a member rotatable with said plates about one of said axes having on it a scale of units of arc concentric with the other of said axes, a first arm rotatable about said other axis and having its free end movable over said scale, a fixed member having on it a scale of units of arc concentric with said one axis, and an arm connected to said rotatable member and having its outer end movable over the scale on said fixed member.

5. A device of the class described, comprising two plane parallel plates of equal thickness disposed in face-to-face contact, each of said plates having a constant and a variable index of refraction, the said plates being so oriented that the direction of one of said indices in one plate is at right angles to the direction of the corresponding index in the other plate, means so to hold plates of different thicknesses that the plates are readily removable therefrom, means associated with the aforesaid means to rotate said plates about mutually perpendicular axes that intersect at the center of said plates and means operable by such rotation about each of said axes to indicate the angular magnitude of the rotation.

6. A device of the class described, comprising two plane parallel plates of equal thickness disposed in face-to-face contact, each of said plates having a constant and a variable index of refraction, the said plates being so oriented that the direction of one of said indices in one plate is at right angles to the direction of the corresponding index in the other plate, means associated with the aforesaid means to manipulate said plates to leave the variable index in either plate unchanged with respect to a ray passing therethrough but to change the variable index in the other plate with respect to a second ray of light passing therethrough and means operable by said manipulation to indicate the magnitude of such manipulation.

7. In a device for compensating for the retardation of a ray of light with respect to a second ray, two equally thick plates of birefringent material, each of which has two plane faces parallel to each other and parallel to the optic axis of the material, placed in face-to-face contact with their optic axes kept at right angles to each other during use and means to rotate said plates about mutually perpendicular axes.

8. In a device for compensating for the retardation of a ray of light, with respect to a second ray, two bodies of birefringent material each having two opposite plane bounding surfaces parallel to each other and to the optic axis in the body, said bodies being disposed with one of said parallel surfaces of each in contact with a surface of the other and with the optic axes kept in the two bodies at right angles to each other during use and means to rotate said plates about mutually perpendicular axes.

9. In a device for compensating for the retardation of a ray of light, with respect to a second ray, an element having two portions each of which has a constant and a variable index of refraction, the directions of said indices in the said portions being so oriented with respect to each other that said element is adjustable to change the variable index in one of said portions with respect to a ray of light passing therethrough while leaving the variable index in the other portion unchanged with respect to a second ray complementary to the said ray during use and to rotate said plates about mutually perpendicular axes.

10. In a device for compensating for the retardation of a ray of light, with respect to a second ray, an element having two portions each of which has a constant and a variable index of refraction, the directions of said indices in the said portions being so oriented with respect to each other that said element is adjustable to change the variable index in one of said portions with respect to a ray of light passing therethrough while leaving the variable index in the other portion unchanged with respect to a second ray passing therethrough during use and means to rotate said plates about mutually perpendicular axes.

11. A device for measuring stresses in material permeable to light, comprising two bodies of birefringent material each having two opposite plane bounding surfaces parallel to each other and to the optic axis in the body, said bodies being disposed with one of said parallel surfaces of each in contact with a surface of the other and with the optic axes in the two bodies kept at right angles to each other when in use, means for rotating said bodies about two axes at right angles to each other, said axes intersecting in the center of said combined bodies, and means to measure the angular magnitude of rotation about each axis.

JOHN A. PLUGGE.